United States Patent
Beyer et al.

(10) Patent No.: US 10,233,321 B2
(45) Date of Patent: Mar. 19, 2019

(54) COMPOSITION, A FILM MADE THEREFROM AND AN ARTICLE INCLUDING THE FILM

(71) Applicant: Dow Global Technologies LLC, Midland, MI (US)

(72) Inventors: Douglas E. Beyer, Manvel, TX (US); Steven R. Jenkins, Traverse City, MI (US); Kurt W. Olson, Midland, MI (US)

( * ) Notice: Subject to any disclaimer, the term of this patent is extended or adjusted under 35 U.S.C. 154(b) by 88 days.

(21) Appl. No.: 15/503,011

(22) PCT Filed: Aug. 10, 2015

(86) PCT No.: PCT/US2015/044415
§ 371 (c)(1),
(2) Date: Feb. 10, 2017

(87) PCT Pub. No.: WO2016/025362
PCT Pub. Date: Feb. 18, 2016

(65) Prior Publication Data
US 2017/0226334 A1 Aug. 10, 2017

Related U.S. Application Data

(60) Provisional application No. 62/037,858, filed on Aug. 15, 2014, provisional application No. 62/038,928, filed on Aug. 19, 2014.

(51) Int. Cl.
*C08L 27/08* (2006.01)
*C08L 33/10* (2006.01)
*C08J 5/18* (2006.01)

(52) U.S. Cl.
CPC .............. *C08L 27/08* (2013.01); *C08J 5/18* (2013.01); *C08L 33/10* (2013.01); *C08J 2327/08* (2013.01); *C08J 2423/08* (2013.01); *C08L 2203/16* (2013.01); *C08L 2205/03* (2013.01)

(58) Field of Classification Search
CPC ...... C08L 27/08; C08L 33/10; C08L 2205/03; C08L 2203/16; C08J 5/18; C08J 2327/08; C08J 2423/08
USPC .......................................................... 524/523
See application file for complete search history.

(56) References Cited

U.S. PATENT DOCUMENTS

| | | | |
|---|---|---|---|
| 5,604,043 A * | 2/1997 | Ahlgren | B32B 27/32 428/518 |
| 5,679,465 A * | 10/1997 | Bekele | B32B 27/08 428/474.4 |
| 6,685,872 B2 | 2/2004 | Dooley et al. | |
| 7,754,300 B2 * | 7/2010 | Beyer | B29C 55/28 264/454 |
| 9,056,972 B2 | 6/2015 | Jeon et al. | |
| 2005/0255263 A1 * | 11/2005 | Lee | A22C 13/0013 428/34.8 |

FOREIGN PATENT DOCUMENTS

WO 2013048746 4/2013

OTHER PUBLICATIONS

International Search Report & Written Opinion for related PCT Application PCT/US2015/044415, dated Oct. 19, 2015 (11 pgs).
International Preliminary Report on Patentability for related PCT Application PCT/US2015/044415, dated Mar. 2, 2017 (8 pgs).

* cited by examiner

*Primary Examiner* — Michael Bernshteyn
(74) *Attorney, Agent, or Firm* — Brooks, Cameron & Huebsch, PLLC

(57) ABSTRACT

A polymer blend including a vinylidene chloride interpolymer; an ethylene-acrylate interpolymer; and optionally one or more additives selected from the group consisting of stabilizers, plasticizers, and processing aids is provided. Also provided is an extruded film and a packaging or container which includes the film.

12 Claims, No Drawings

COMPOSITION, A FILM MADE THEREFROM AND AN ARTICLE INCLUDING THE FILM

FIELD OF INVENTION

The disclosure relates to a polymer blend, a film made therefrom and an article including the film.

BACKGROUND OF THE INVENTION

Vinylidene chloride interpolymers and copolymers are commonly used to produce monolayer films, including cling films for household wrapping applications. In most cases a vinylidene chloride-vinyl chloride copolymer resin is used. As an alternative vinylidene chloride-acrylate copolymers, such as a vinylidene chloride-methyl acrylate copolymer, may be used to produce monolayer films. However such films could be improved by enhancing cling and toughness.

SUMMARY OF THE INVENTION

The disclosure is for a composition, a film made therefrom and an article including the film. In one embodiment, the disclosure provides a polymer blend comprising a vinylidene chloride interpolymer; an ethylene-acrylate interpolymer; and optionally one or more additives selected from the group consisting of stabilizers, plasticizers, and processing aids.

In yet another embodiment, the disclosure provides a film made from the polymer blend.

In another embodiment, the disclosure further provides a packaging or container comprising the film.

DETAILED DESCRIPTION OF THE INVENTION

The disclosure provides a polymer blend, a film made therefrom and an article including the film.

The polymer blend according to the disclosure comprises a vinylidene chloride interpolymer; an ethylene-acrylate interpolymer; and optionally one or more additives selected from the group consisting of stabilizers, plasticizers, and processing aids.

The disclosure further provides an extruded film formed from any embodiment of the film composition disclosed herein.

The disclosure further provides a container or packaging comprising any embodiment of the film disclosed herein.

As used herein, the terms "vinylidene chloride interpolymer" and "PVDC" encompass copolymers of vinylidene chloride which have units derived from vinylidene chloride and one other monomer as well as interpolymers of vinylidene chloride which have units derived from vinylidene chloride and more than one other monomer. Interpolymers further include, for example, terpolymers (polymers having units derived from vinylidene chloride and two other monomers) and tetrapolymers (polymers having units derived from vinylidene chloride and three other monomers). Vinylidene chloride copolymers are disclosed, for example, in U.S. Pat. No. 7,754,300. Vinylidene chloride terpolymers are disclosed, for example, in PCT Publication Nos. WO2013048746 and WO2013048738.

In a particular embodiment, the vinylidene chloride interpolymer is a vinylidene chloride-alkyl acrylate copolymer. Alkyl acrylates which may be used in the vinylidene chloride-alkyl acrylate copolymer include $C_1$-$C_{20}$ alkyl acrylates, such as methyl acrylate, ethyl acrylate, and butyl acrylate. In one embodiment the vinylidene chloride-based copolymer is a vinylidene chloride-methyl acrylate copolymer and/or a vinylidene chloride-butyl acrylate copolymer. In a specific embodiment, the vinylidene chloride-based copolymer is a vinylidene chloride-methyl acrylate copolymer.

In one embodiment the vinylidene chloride interpolymer is a vinylidene chloride-methyl acrylate copolymer, wherein the vinylidene chloride-methyl acrylate copolymer comprises from 3.0 to 9.0 percent by weight ("weight %" or "wt %") units derived from methyl acrylate, based on the total weight of the vinylidene interpolymer. All individual values and subranges from 3.0 to 9.0 wt % are included and disclosed herein; for example, the amount of the units derived from methyl acrylate can range from a lower limit of 3.0, 3.5, or 4.0 wt % to an upper limit of 5.5, 6.0, 7.0 or 9.0 wt %. For example, the amount of the units derived from methyl acrylate can be from 3.0 to 9.0 wt %, or in the alternative, from 3.0 to 6.0 wt %, or in the alternative, from 6.0 to 9.0 wt %, or in the alternative, from 4.0 to 8.0 wt %, or in the alternative from 4.5 to 5.5 wt %, or in the alternative, from 4 to 6 wt %.

In another embodiment the vinylidene chloride-based copolymer is a vinylidene chloride-methyl acrylate copolymer, wherein the vinylidene chloride-methyl acrylate copolymer comprises from 3.4 to 10.0 mole % units derived from methyl acrylate. All individual values and subranges from 3.4 to 10.0 mole % are included and disclosed herein; for example, the amount of units derived from methyl acrylate can range from a lower limit of 3.4, 3.9, or 4.5 mole % to an upper limit of 6.2, 6.7, 7.8, or 10.0 mole %. For example, the amount of the amount of units derived from methyl acrylate can be from 3.4 to 10.0 mole %, or in the alternative, from 3.4 to 6.7 mole %, or in the alternative, from 6.7 to 10.0 mole %, or in the alternative, from 4 to 8 mole %, or in the alternative from 5.0 to 6.2 mole %, or in the alternative, from 4.5 to 6.7 mole %.

In another embodiment the vinylidene chloride-based copolymer is a vinylidene chloride-ethyl acrylate and/or vinylidene chloride-butyl acrylate copolymer, wherein the vinylidene chloride-ethyl acrylate and/or vinylidene chloride-butyl acrylate copolymer comprises from 3.4 to 10.0 mole % units derived from the alkyl acrylate(s). All individual values and subranges from 3.4 to 10.0 mole % are included and disclosed herein; for example, the amount of the total units derived from the alkyl acrylate(s) can range from a lower limit of 3.4, 3.9, or 4.5 mole % to an upper limit of 6.2, 6.7, 7.8, or 10.0 mole %. For example, the amount of the units derived from the alkyl acrylate(s) can be from 3.4 to 10.0 mole %, or in the alternative, from 3.4 to 6.7 mole %, or in the alternative, from 6.7 to 10.0 mole %, or in the alternative, from 4 to 8 mole %, or in the alternative from 5.0 to 6.2 mole %, or in the alternative, from 4.5 to 6.7 mole %.

In one embodiment, the vinylidene chloride interpolymer has a weight average molecular weight of at least 60,000 daltons. All individual values and subranges from at least 60,000 daltons are included and disclosed herein. For example the molecular weight of the vinylidene chloride interpolymer can be from a lower limit of 60,000; 70,000; 80,000; or 90,000 daltons. In a particular embodiment, the molecular weight of the vinylidene chloride interpolymer is no greater than 200,000 daltons. All individual values and subranges from at most 200,000 daltons are included and disclosed herein; for example, the upper limit of the vinylidene chloride interpolymer can be 200,000; 150,000; 130,000; or 125,000 daltons. For example, vinylidene chloride interpolymer molecular weight can be from 60,000 to 200,000 daltons, or in the alternative, from 60,000 to 125,000 daltons, or in the alternative, from 125,000 to 200,000 daltons, or in the alternative, from 80,000 to 130,000 daltons, or in the alternative, from 90,000 to 125,000 daltons.

Vinylidene chloride interpolymer useful in the polymer blend include interpolymer of vinylidene chloride with one, two or more comonomers selected from the group consisting of alkyl acrylates, non-vinylidene chloride vinyl monomers and combinations thereof.

The vinylidene chloride interpolymerization is within the skill in the art such as taught by U.S. Pat. Nos. 2,968,651, 3,007,903, 3,879,359, and 6,627,679 except that specific monomers and monomer compositions necessary to achieve the desired polymer blends are used along with and specific selections of polymerization conditions including; time, temperature, initiators, and other additives. As used herein, copolymerization includes the polymerization process with more than one monomer.

Non-vinylidene chloride vinyl monomers useful in the invention include all vinyl monomers except for vinylidene chloride. Such monomers include, for example, styrene, vinyl acetate, vinyl chloride, methyl methacrylate, ethyl methacrylate, acrylic acid, methacrylic acid, itaconic acid, acrylonitrile, methacrylonitrile, and N-vinyl pyrrolidone.

In a particular embodiment, the vinylidene chloride interpolymer comprises units derived from vinylidene chloride monomer and one or more acrylic monomers and/or one or more methacrylic monomers.

In another embodiment, the vinylidene chloride interpolymer comprises units derived from vinylidene chloride monomer and vinyl chloride.

The disclosure further provides the polymer blend, film and container or packaging according to any embodiment disclosed herein, except that the vinylidene chloride interpolymer comprises units derived from one or more di- or multifunctional vinyl monomers. Exemplary di-functional and multi-functional vinyl monomers include diacrylates and triacrylates. Exemplary diacrylates include the acrylic acid diesters of such alcohols as 1,6-hexanediol, 1,4 butanediol, 1,3 butanediol, ethylene glycol, diethylene glycol, triethylene glycol and the like and combinations thereof. Triacrylates include the acrylic acid triesters of such alcohols as 1,1,1 trimethylolpropane, glycerol and the like and combinations thereof. In a particular embodiment, the di- or multifunctional vinyl monomers are selected from the group consisting of 1,2 ethanediol diacrylate, 1,4 butanediol diacrylate, and 1,6 hexanediol diacrylate.

The ethylene-acrylate interpolymer is any copolymer having units derived only from ethylene and from one or more alkyl acrylates. Ethylene-acrylate interpolymer are of the general chemical formula of $CH_2$=$C(R^1)CO_2R^2$ where $R^1$ can be hydrogen or an alkyl group of 1-8 carbon atoms and $R^2$ is an alkyl group of 1-8 carbon atoms. Ethylene-acrylate interpolymers include copolymers which include units derived from ethylene and units derived from one acrylic monomer as well as interpolymers having units derived from ethylene and units derived from two or more acrylic monomers. Exemplary ethylene-acrylate copolymers can be based on ethylene-acrylate, ethylene-methacrylate, ethylene-n-butyl acrylate-glycidyl methacrylate, ethylene-glycidyl methacrylate, ethylene-butyl-acrylate, ethylene acrylic esters, or blends thereof. In a particular embodiment, the ethylene-acrylate copolymer is selected from the group consisting of methyl acrylate, ethyl acrylate and butyl acrylate. In another embodiment, the ethylene-acrylate copolymer is methyl acrylate.

In a particular embodiment, the ethylene-acrylate interpolymer comprises units derived from methyl acrylate and the methyl acrylate is at least 10 wt % of the ethylene-acrylate interpolymer. All individual values and subranges from at least 10 wt % are included and disclosed herein. For example, the amount of units derived from methyl acrylate in the ethylene-acrylate interpolymer can be from a lower limit of 10, 15 or 20 wt %. In another embodiment, the amount of units derived from methyl acrylate in the ethylene-acrylate interpolymer is at most 40 wt %. All individual values and subranges from at most 40 wt % are included and disclosed herein. For example, the upper limit of the units derived from methyl acrylate in the ethylene-acrylate interpolymer may be 40, 35 or 30 wt % of the polymer blend. In specific embodiments, the amount of units derived from methyl acrylate in the ethylene-acrylate interpolymer in the polymer blend can be from 10 to 40 wt %, or in the alternative, from 10 to 25 wt %, or in the alternative, from 25 to 40 wt %, or in the alternative, from 15 to 35 wt %, or in the alternative, from 20 to 30 wt %.

In a particular embodiment, the ethylene-acrylate interpolymer comprise units derived from methyl acrylate and the units derived from methyl acrylate is at least 3.5 mole % of the ethylene-acrylate interpolymer. All individual values and subranges from at least 3.5 mole % are included and disclosed herein. For example, the amount of methyl acrylate in the ethylene-acrylate interpolymer in the polymer blend can be from a lower limit of 3.5, 5.4 or 7.5 mole %. In another embodiment, the amount of methyl acrylate in the ethylene-acrylate interpolymer is at most 17.8 mole %. All individual values and subranges from at most 17.8% are included and disclosed herein. For example, the upper limit of the methyl acrylate in the ethylene-acrylate interpolymer may be 17.8, 14.9 or 12.2 mole % of the polymer blend. In specific embodiments, the amount of methyl acrylate in the ethylene-acrylate interpolymer can be from 3.5 to 17.8 mole %, or in the alternative, from 3.5 to 10.5 mole %, or in the alternative, from 10.5 to 17.8 mole %, or in the alternative, from 5.4 to 14.9 mole %, or in the alternative, from 7.5 to 12.2 mole %.

In a particular embodiment, the ethylene-acrylate copolymer comprises units derived from ethylene and units derived from a combination of ethyl acrylate and butyl acrylate and the units derived from ethyl/butyl acrylate is at least 3.5 mole % of the ethylene-acrylate interpolymer. All individual values and subranges from at least 3.5 mole % are included and disclosed herein. For example, the amount of ethyl/butyl acrylate in the ethylene-acrylate interpolymer in the polymer blend can be from a lower limit of 3.5, 5.4 or 7.5 mole %. In another embodiment, the amount of ethyl/butyl acrylate in the ethylene-acrylate interpolymer is at most 17.8 mole %. All individual values and subranges from at most 17.8% are included and disclosed herein. For example, the upper limit of the ethyl/butyl acrylate in the ethylene-acrylate interpolymer may be 17.8, 14.9 or 12.2 mole % of the polymer blend. In specific embodiments, the amount of ethyl/butyl acrylate in the ethylene-acrylate interpolymer can be from 3.5 to 17.8 mole %, or in the alternative, from 3.5 to 10.5 mole %, or in the alternative, from 10.5 to 17.8 mole %, or in the alternative, from 5.4 to 14.9 mole %, or in the alternative, from 7.5 to 12.2 mole %.

In another embodiment, the ethylene-acrylate interpolymer is ground, extruded and pelletized or otherwise reduced in particle size prior to incorporation with the vinylidene chloride interpolymer.

In yet another embodiment, the ethylene-acrylate interpolymer has a melt index, $I_2$, of at least 0.5 g/10 min. All individual values and subranges from at least 0.5 g/10 min are included and disclosed herein. For example, the $I_2$ of the ethylene-acrylate interpolymer can be from a lower limit of 0.5, 1.0, or 2.0 g/10 min. In another embodiment, the $I_2$ of the ethylene-acrylate interpolymer is at most 400 g/10 min. All individual values and subranges from at most 400 g/10 min are included and disclosed herein. For example, the $I_2$ of the ethylene-acrylate interpolymer can be from an upper limit of 400, 200, 50, or 10 g/10 min.

In specific embodiments, the $I_2$ of the ethylene-acrylate interpolymer can be from 0.5 to 400 g/10 min, or in the alternative, from 0.5 to 200 g/10 min, or in the alternative, from 200 to 400 g/10 min, or in the alternative, from 1.0 to 50 g/10 min, or in the alternative, from 2.0 to 10 g/10 min.

The polymer blend further optionally comprises one or more additives selected from the group consisting of stabilizers, plasticizers, processing aids, antioxidants, and colorants. In a particular embodiment, the polymer blend further comprises one or more epoxidized stabilizers and/or one or more plasticizers. Epoxidized stabilizers include, for example, epoxidized oils such as epoxidized soybean oil or epoxidized linseed oil. Plasticizers include, for example, aliphatic ester plasticizers such as acetyl tributyl citrate or dibutyl sebecate.

In those embodiments in which one or more epoxidized stabilizers and one or more plasticizers are present, the combined amount can be at least 2.0 wt % based on the weight of the vinylidene chloride copolymer. All individual values and subranges from at least 2.0 wt % are included and disclosed herein. For example, the combined amount of one or more epoxidized stabilizers and one or more plasticizers can be from a lower limit of 2.0, 3.0, or 4.0 wt % based on the weight of the vinylidene chloride copolymer. In another embodiment, the polymer blend comprises one or more epoxidized stabilizers and one or more plasticizers and the combined weight of the one or more epoxidized stabilizers and one or more plasticizers is at most 9.0 wt % based on the weight of the vinylidene chloride copolymer. All individual values and subranges from at most 9.0 wt % are included and disclosed herein. For example, the combined weight of one or more epoxidized stabilizers and one or more plasticizers can be from an upper limit of 9.0, 8.0 or 7.0 wt % based on the weight of the vinylidene chloride copolymer. In specific embodiments, the combined amount of one or more epoxidized stabilizers and one or more plasticizers can be from 2.0 to 9.0 wt % based on the weight of the vinylidene chloride copolymer, or in the alternative, from 2.0 to 5.5 wt % based on the weight of the vinylidene chloride copolymer, or in the alternative, from 5.5 to 9.0 wt % based on the weight of the vinylidene chloride copolymer, or in the alternative, from 3 to 8 wt % based on the weight of the vinylidene chloride copolymer, or in the alternative, from 4 to 7 wt % based on the weight of the vinylidene chloride copolymer.

In one embodiment, the polymer blend comprises one or more epoxidized stabilizers and one or more plasticizers wherein the total weight of the epoxidized stabilizer(s) is at least 0.2 wt % of the total weight of the combined one or more epoxidized stabilizers and one or more plasticizers. All individual values and subranges from at least 0.2 wt % are included and disclosed herein. For example, the total weight of the epoxidized stabilizers(s) can be from a lower limit of 0.2, 0.5, 1.0, 1.5 or 2.0 wt % of the total weight of the combined one or more epoxidized stabilizers and one or more plasticizers.

In one embodiment, the components of the polymer blend are dry mixed to form a film composition. Any type of dry mixer may be used including any selected from low intensity mixers, such as cone blenders, V tumble blenders and ribbon blenders, medium intensity mixers, such as plow blenders, and high intensity mixers, such as Henschel type blenders.

The components of the polymer blends may be mixed or blended in any order. For example, the epoxidized stabilizer and plasticizer, when present, may be blended with the vinylidene chloride copolymer prior to blending with the ethylene-acrylate copolymer. In yet another embodiment, the epoxidized stabilizer and/or plasticizer can be added to the vinylidene chloride before copolymerization with comonomer(s). That is, the epoxidized stabilizer and/or plasticizer can be added with one or more of the vinylidene chloride monomers. Alternatively, the epoxidized stabilizer and/or plasticizer can be added in slurry or in a separate blending step or any combination of such blending methods.

In yet another embodiment, the ethylene-acrylate copolymer and/or optional additives may be mixed with the vinylidene chloride copolymer by metering the ethylene-acrylate copolymer and/or optional additives from separate feeders at the feed throat of an extruder.

The extruded film of the present disclosure may be an extruded monolayer film. In one embodiment, the extruded film is formed using a double bubble blown film process. In one embodiment, the film has a thickness of at least 0.2 mils. All individual values and subranges from at least 0.2 mils are included and disclosed herein. For example, the thickness of the film can be from a lower limit of 0.2, 0.3 or 0.4 mils. In another embodiment, the film has a thickness of no greater than 10 mils. All individual values and subranges from no greater than 10 mils are included and disclosed herein. For example, the upper limit of the thickness of the film can be 10, 5, 3, or 2 mils. In specific embodiments, the thickness of the film can be from 0.2 to 10 mils, or in the alternative, from 0.2 to 5 mils, or in the alternative, from 5 to 10 mils, or in the alternative, from 0.2 to 10 mils, or in the alternative, from 0.3 to 3 mils, or in the alternative, from 0.4 to 2 mils, or in the alternative, 0.2 to 5 mils.

The disclosure further provides the extruded film according to any embodiment disclosed herein, except that the extruded film is laminated with one or more other films.

The disclosure further provides a coextruded multi-layer film comprising an external layer which comprises the film composition according to any embodiment disclosed herein.

The disclosure further provides the extruded film according to any embodiment disclosed herein wherein the extruded film is a cling film.

The disclosure further provides a container or packaging comprising any embodiment of the film disclosed herein.

EXAMPLES

The following examples illustrate the present invention but are not intended to limit the scope of the invention.

Comparative Example A

The vinylidene chloride/methyl acrylate copolymer XUS 32904.01 (commercially available from The Dow Chemical Company) was blended with 1.9 pph of epoxidized soybean oil and 4.0 pph dibutyl sebecate plasticizer. This blend was then extruded to produce an approximately 0.4 mil film using a conventional monolayer blown film extrusion process [see, e.g., Encyclopedia of Polymer Science and Technology (online edition), *Vinylidene Chloride Polymers*, published Feb. 15, 2011, pp 37-39] producing a master roll. This master roll was subsequently slit into 12 inch wide by 50 foot long rolls. The resulting film was evaluated for oxygen permeability and cling performance.

Film slitting of Comparative Example A: During the film slitting operation the film was found to be too brittle to slit properly and would cause the film to break prematurely and require the operator to restring the film slitting machine. As a consequence the slitting line speed had to be slowed from typical conversion speeds in order to maintain the slitting process and produce converted rolls of film.

Barrier and cling testing results for Comparative Example A are shown in Table 1. These results show that the Comparative Example A exhibits brittle performance during slitting and less than desired cling performance.

Comparative Example B

The vinylidene chloride/methyl acrylate copolymer XUS 32904.01 was blended with 1.9 pph of epoxidized soybean oil and 5.0 pph dibutyl sebecate plasticizer. This blend was then extruded to produce an approximately 0.4 mil film in the same manner as Comparative Example A. Additionally slit film rolls were prepared as in Comparative Example A.

Film slitting of Comparative Example B: During the film slitting operation the film was found to slit well at typical conversion speeds without brittleness problems that would slow the film slitting operation Barrier and Cling testing results for Comparative Example B are shown in Table 1.

These results show that the added plasticizer improves slitting and cling, but significantly increased permeability, which is undesirable.

Inventive Example 1

The vinylidene chloride/methyl acrylate copolymer XUS 32904.01 was blended with 1.9 pph of epoxidized soybean oil and 4.0 pph dibutyl sebecate plasticizer and 1.0 pph ethylene/methyl acrylate copolymer LOTRYL 28MA07 (commercially available from Arkema Inc. (Pasadena, Tex., USA), 0.1 pph oxidized polyethylene wax and 0.1 pph paraffin wax. This blend was then extruded to produce an approximately 0.4 mil film in the same manner as Comparative Example A. Additionally slit film rolls were prepared in similar manner.

Film slitting of Inventive Example 1: During the film slitting operation the film was found to slit well at typical conversion speeds without brittleness problems that would slow the film slitting operation.

Barrier and cling testing results are shown in Table 1.

These results show that addition of the ethylene/acrylate copolymer resin improves the slitting operation and improves cling, without significant increase in oxygen permeability.

oil and 4.0 pph dibutyl sebecate plasticizer. This blend was then extruded to produce an approximately 0.4 mil film in the same manner as Comparative Example A. The film roll produced was double wound as produced from the collapsed bubble.

Barrier testing was done in the sample manner as Comparative Example A. Toughness of the film was estimated based on how easily the film would tear. Prior to cling testing a 10"×10" specimen was cut from the double wound film. The two layers were then separated. Tearing of the film was observed as the two layers were separated. Specimens that had less than 3 tears were considered good, while specimens that were prone to tearing (3 or more) were considered brittle.

Cling testing was done in the same manner as Comparative Example A, however, it was noted that the % cling values were somewhat lower in the double wound samples, particularly on one side.

Comparative Example D

The vinylidene chloride/methyl acrylate copolymer XUS 32904.01 was blended with 2.0 pph of epoxidized soybean oil and 5.0 pph dibutyl sebecate plasticizer. This blend was then extruded to produce an approximately 0.4 mil film that is double wound in the same manner as Comparative Example C. Barrier, toughness and cling testing were also done in the same manner as Comparative Example C and shown in the Table 2.

Inventive Example 2

The vinylidene chloride/methyl acrylate copolymer XUS 32904.01 was blended with 2.0 pph of epoxidized soybean oil and 4.0 pph dibutyl sebecate plasticizer and 1.0 pph ethylene/methyl acrylate copolymer LOTRYL 29MA03 available from Arkema, 0.1 pph oxidized polyethylene wax and 0.1 pph paraffin wax. This blend was then extruded to produce an approximately 0.4 mil film that is double wound in the same manner as Comparative Example C. Barrier, toughness and cling testing were also done in the same manner as Comparative Example C and shown in Table 2.

Inventive Example 3

The vinylidene chloride/methyl acrylate copolymer XUS 32904.01 was blended with 2.0 pph of epoxidized soybean oil and 4.0 pph dibutyl sebecate plasticizer and 1.0 pph ethylene/ethyl acrylate copolymer AMPLIFY EA101 available from Dow Chemical, 0.1 pph oxidized polyethylene wax and 0.1 pph paraffin wax. This blend was then extruded to produce an approximately 0.4 mil film that is double

TABLE 1

| Example | % Plasticizer | % Modifier | Permeability | % Cling | Slitting |
| --- | --- | --- | --- | --- | --- |
| Comparative Example A | 4 | 0 | 19 | 80/90 | Brittle |
| Comparative Example B | 5 | 0 | 41 | 95/100 | Good |
| Example 1 | 4 | 1 | 24 | 100/100 | Good |

*cc-mil/m$^2$-atm-day

Comparative Example C

The vinylidene chloride/methyl acrylate copolymer XUS 32904.01 was blended with 2.0 pph of epoxidized soybean wound in the same manner as Comparative Example C. Barrier, toughness and cling testing were also done in the same manner as Comparative Example C and shown in Table 2.

Inventive Example 4

The vinylidene chloride/methyl acrylate copolymer XUS 32904.01 was blended with 2.0 pph of epoxidized soybean oil and 4.0 pph dibutyl sebecate plasticizer and 1.0 pph ethylene/methyl acrylate copolymer LOTRYL 29MA03 available from Arkema, 0.1 pph oxidized polyethylene wax and 0.1 pph paraffin wax. This blend was then extruded to produce an approximately 0.4 mil film that is double wound in the same manner as Comparative Example C. Barrier, toughness and cling testing were also done in the same manner as Comparative Example C and shown in Table 2.

Inventive Example 5

The vinylidene chloride/methyl acrylate copolymer base resin was blended with 0.5 pph ethylene/methyl acrylate copolymer LOTRYL 29MA03 available from Arkema, 0.1 pph oxidized polyethylene wax and 0.1 pph paraffin wax. The base resin used is like the XU 32904.01 except approximately 2% epoxidized soybean oil and 4% dibutyl sebecate had been previously added to the resin. This blend was then extruded to produce an approximately 0.4 mil film that is double wound in the same manner as Comparative Example C. Barrier, toughness and cling testing were also done in the same manner as Comparative Example C and shown in Table 2.

Inventive Example 6

The vinylidene chloride/methyl acrylate copolymer base resin was blended with 5.0 pph ethylene/methyl acrylate copolymer LOTRYL 29MA03 available from Arkema, 0.1 pph oxidized polyethylene wax and 0.1 pph paraffin wax. The base resin used is like the XU 32904.01 except approximately 2% epoxidized soybean oil and 4% dibutyl sebecate had been previously added to the resin. This blend was then extruded to produce an approximately 0.4 mil film that is double wound in the same manner as Comparative Example C. Barrier, toughness and cling testing were also done in the same manner as Comparative Example C and shown in Table 2.

Inventive Example 7

The vinylidene chloride/methyl acrylate copolymer base resin was blended with 1.0 pph ethylene/butyl acrylate copolymer LOTRYL 35BA40 available from Arkema, 0.1 pph oxidized polyethylene wax and 0.1 pph paraffin wax. The base resin used is like the XU 32904.01 except approximately 2% epoxidized soybean oil and 4% dibutyl sebecate had been previously added to the resin. This blend was then extruded to produce an approximately 0.4 mil film that is double wound in the same manner as Comparative Example C. Barrier, toughness and cling testing were also done in the same manner as Comparative Example C and shown in Table 2.

TABLE 2

| Example | Modifier | Permeability* | % Cling | Toughness |
|---|---|---|---|---|
| Comparative Ex. C | None | 23 | 40/75 | 7, brittle |
| Comparative Ex. D | None | 36 | 50/70 | 5, brittle |
| Example 2 | 1% EMA 3 | 21 | 85/100 | 0, good |
| Example 3 | 1% EEA 1 | 19 | 75/90 | 0, good |
| Example 4 | 2% EMA 1 | 26 | 75/100 | 0, good |
| Example 5 | 0.5% EMA 3 | 29 | 85/85 | 2, good |
| Example 6 | 5% EMA 1 | 22 | 75/90 | 1, good |
| Example 7 | 1% EBA 1 | 26 | 80/90 | 1, good |

*cc-mil/m$^2$-atm-day

Table 3 provides the source and acrylate content for each of the ethylene/alkyl acrylate copolymers used in the foregoing examples. As shown in Table 3, EMA 1; EMA 2; EMA 3 and EBA 1 are commercially available from Arkema, Inc. (Pasadena, Tex., USA), and EEA 1 is commercially available from The Dow Chemical Company (Midland, Mich., USA).

TABLE 3

| Modifier | Tradename | Supplier | Type | Acrylate Weight % | Acrylate Mole % |
|---|---|---|---|---|---|
| EMA 1 | LOTRYL 24MA02 | Arkema | Methyl | 24 | 9 |
| EMA 2 | LOTRYL 28MA07 | Arkema | Methyl | 28 | 11 |
| EMA 3 | LOTRYL 29MA03 | Arkema | Methyl | 29 | 12 |
| EEA 1 | AMPLIFY EA101 | Dow | Ethyl | 19 | 6 |
| EBA 1 | LOTRYL 35BA40 | Arkema | Butyl | 35 | 11 |

Test Methods

Test methods include the following:

Extrusion Performance: Extrusion performance is defined based on ease of processing. Ease of processing can be attributed to the amount of pressure variation within the extruder over a period of time, the amount of die slough that is produced over a period of time, the ability to initiate the bubble blowing process, the stability of the bubble, and the amount of bubble breaks that occur over a period of time.

Barrier testing: Oxygen barrier testing was completed using a MOCON OXTRAN 2/21 according to ASTM D-3925. Oxygen transmission rate and oxygen permeability were measured in accordance with ASTM D-3985. Testing was done using a MOCON OX-TRAN 2/21. Test conditions include; 10% oxygen concentration, 23° C. test temperature, 50 cm$^2$ test area, 50% RH on both the permeant and carrier sides of the film.

Cling testing: Cling testing utilizes a straight sided bowl that is 4 1/16" diameter and 1 3/4" tall. Prior to testing this bowl is cleaned by wiping with isopropyl alcohol and air dried. For testing film samples are cut into 10" by 10" squares. The film is then placed across the top of the bowl and is pressed against the sides of the bowl to create a seal. The resulting sealed bowl is inspected for loose areas and the amount of film clinging to two the bowl is estimated as a % of the bowls circumference. This test is then repeated for the opposite side of the same film specimen. The reported cling result is the % cling circumference for both sides of the film.

Molecular weight: Weight average molecular weight is measured by size exclusion chromatography using polystyrene calibration. Sample preparation includes dissolving a polyvinylidene chloride resin sample in tetrahydrofuran (THF) at 50° C. The polymers are then analyzed for determination of molecular weight by gel permeation chromatography (GPC) using the Polymer Laboratories Software on a Hewlett Packard 1 100 chromatograph equipped with two columns in series. These columns contain 5μ styrene/divinylbenzene copolymer beads commercially available from Polymer Laboratories under the trade designation PLGel 5μ MIXED-C. The solvent is nitrogen purged HPLC Grade THF. The flow rate is 1.0 milliliter/minute and the injection size is 50 microliters. The molecular weight determination is deduced by using ten narrow molecular weight distribution polystyrene standards (commercially available from Polymer Labs under the trade designation Narrow PS set (about 3,000,000 to 2000 Mp)) in conjunction with their elution volumes.

The present invention may be embodied in other forms without departing from the spirit and the essential attributes thereof, and, accordingly, reference should be made to the appended claims, rather than to the foregoing specification, as indicating the scope of the invention.

We claim:

1. A polymer blend comprising:
   a vinylidene chloride interpolymer comprising units derived from one or more di- or multifunctional vinyl monomers;
   an ethylene-acrylate interpolymer; and
   optionally one or more additives selected from the group consisting of stabilizers, plasticizers, and processing aids.

2. The polymer blend according to claim 1, wherein the vinylidene chloride interpolymer comprises units derived from vinylidene chloride and units derived from one or more comonomers.

3. The polymer blend according to claim 1, wherein the vinylidene chloride interpolymer comprises units derived from vinylidene chloride and units derived from one or more comonomers selected from the group consisting of methyl acrylate and butyl acrylate.

4. The polymer blend according to claim 1 wherein the vinylidene chloride interpolymer comprises units derived from vinylidene chloride and vinyl chloride.

5. The polymer blend according to claim 1, wherein the one or more di- or multifunctional vinyl monomers is selected from the group consisting of 1,2 ethanediol diacrylate, 1,4 butanediol diacrylate, and 1,6 hexanediol diacrylate.

6. The polymer blend according to claim 1, wherein the ethylene-acrylate interpolymer comprises units derived from ethylene and units derived from two or more acrylate comonomers.

7. The polymer blend according to claim 1, wherein the one or more additives are selected form the group consisting of ethylene vinyl acetates, acrylic polymers and vinyl chloride vinyl acetate copolymers.

8. An extruded film formed from the polymer blend according to claim 1.

9. The extruded film of claim 8 wherein the film is a monolayer film.

10. The extruded film of claim 8 laminated with one or more other films.

11. A coextruded multi-layer film comprising an external layer formed from the polymer blend according to claim 1.

12. A container or packaging comprising the extruded film according to claim 8.

* * * * *